(12) United States Patent
Itakura et al.

(10) Patent No.: US 8,937,605 B2
(45) Date of Patent: Jan. 20, 2015

(54) TOUCH SCREEN PANEL AND METHOD OF FABRICATING THE SAME

(75) Inventors: Mikiya Itakura, Yongin (KR); Kwan-Young Han, Yongin (KR); Tae-Hyeog Jung, Yongin (KR); Sun-Haeng Cho, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 244 days.

(21) Appl. No.: 13/284,534

(22) Filed: Oct. 28, 2011

(65) Prior Publication Data

US 2012/0113032 A1     May 10, 2012

(30) Foreign Application Priority Data

Nov. 8, 2010 (KR) ..................... 10-2010-0110268

(51) Int. Cl.
*G06F 3/044* (2006.01)

(52) U.S. Cl.
CPC ...... *G06F 3/044* (2013.01); *G06F 2203/04103* (2013.01)
USPC .......................................... 345/174

(58) Field of Classification Search
None
See application file for complete search history.

(56) References Cited

U.S. PATENT DOCUMENTS

| 2008/0309633 A1 | 12/2008 | Hotelling et al. |
| 2009/0236151 A1 | 9/2009 | Yeh et al. |
| 2010/0182267 A1 * | 7/2010 | Lee et al. ...................... 345/173 |
| 2012/0106063 A1 * | 5/2012 | Mathew et al. .......... 361/679.21 |

FOREIGN PATENT DOCUMENTS

| JP | 2008-165436 | 7/2008 |
| JP | 2009-230735 | 10/2009 |
| JP | 2010-079781 | 4/2010 |
| JP | 2010-235646 | 10/2010 |
| KR | 1020070009724 A | 1/2007 |
| KR | 1020090058072 A | 6/2009 |
| KR | 100908102 B1 | 7/2009 |

OTHER PUBLICATIONS

JPO Office action dated Nov. 25, 2014, for corresponding Japanese Patent application 2011-038481, (4 pages).

* cited by examiner

*Primary Examiner* — Joseph Haley
(74) *Attorney, Agent, or Firm* — Christie, Parker & Hale, LLP

(57) ABSTRACT

A touch screen panel includes: a thin film that includes an active area and a non-active area around the active area; sensing patterns in the active area on a first side of the thin film; sensing lines coupled to the sensing patterns, in the non-active area on the first side; a decoration layer on a second side of the thin film, corresponding to the non-active area; and a functional coating layer on the second side of the thin film with the decoration layer.

9 Claims, 5 Drawing Sheets

TOUCH SCREEN PANEL AND METHOD OF FABRICATING THE SAME

CROSS-REFERENCE TO RELATED APPLICATION

This application claims priority to and the benefit of Korean Patent Application No. 10-2010-0110268, filed on Nov. 8, 2010, in the Korean Intellectual Property Office, the entire content of which is incorporated herein by reference.

BACKGROUND

1. Field

Aspects of embodiments according to the present invention relate to a touch screen panel that is provided in an image display device.

2. Description of Related Art

Touch screen panels are input devices that, for example, allow a person to select instructions displayed on the screen of an image display device using the person's hand or another suitable object, such as a stylus, to input commands of a user. To this end, the touch screen panels may be provided on a front face of the image display device and convert positions where the person's hand or other object directly contacts the image display device into electrical signals. Accordingly, the instruction corresponding to the contact point is received as an input signal. As touch screen panels can replace separate input devices that operate by being connected to the image display device, such as a keyboard or a mouse, the use of touch screen panels is being expanded.

Implementations of touch screen panels include an ohmic layer type, a photosensitive type, and a capacitive type. The capacitive type of touch screen panel converts a contact position into an electrical signal by sensing a change in electrostatic capacitance formed when a person's hand or an object contacts the touch screen panel.

Touch screen panels may be attached to the outside of flat panel displays, such as a liquid crystal display or an organic light emitting display. Touch screen panels may need to be thin and possess a high degree of transparency to function for their intended purpose.

In some implementations, capacitive-type touch screen panels are fabricated by first forming a thin film and then forming a pattern to form a touch sensor. As such, high thermal resistance and chemical resistance may be needed during fabrication. Accordingly, such capacitive-type touch screen panels may form a touch sensor on a glass substrate. However, the thickness of the glass substrate that is appropriate to carry about the above processes may be such that the resulting touch screen panel is not sufficiently thin to function for its intended purpose.

SUMMARY

Aspects of embodiments of the present invention are directed to implementing an ultrathin touch screen panel, by forming a thin film on a glass substrate (this is used as a carrier substrate), forming sensing patterns for touch sensors on the film, and separating the glass substrate. Further aspects of embodiments of the present invention provide for a touch screen panel that can reduce the thickness of an image display device equipped with the touch screen, by forming a decoration layer on the other side of the film with the sensing patterns, and forming a functional coating layer on the surface with the decoration layer to use the film as a window substrate.

In an exemplary embodiment according to the present invention, a touch screen panel is provided. The touch screen panel includes a thin film that includes an active area and a non-active area around the active area, sensing patterns in the active area on a first side of the thin film, sensing lines coupled to the sensing patterns and in the non-active area on the first side, a decoration layer on a second side of the thin film and corresponding to the non-active area, and a functional coating layer on the second side of the thin film.

The sensing patterns may include first sensing cells coupled in a first direction, first connecting lines coupling the first sensing cells in the first direction, second sensing cells coupled in a second direction that crosses the first direction, and second connecting lines coupling the second sensing cells in the second direction.

Insulating layers may be at crossing regions of the first connecting lines and the second connecting lines.

The touch screen panel may further include black matrix in the non-active area on the first side of the thin film.

The decoration layer may be attached in a film to the second side of the thin film.

The functional coating layer may include one or more of an anti-reflective layer, an anti-finger layer, or a hard coating layer.

The thin film with the functional coating layer may function as a window and the second side may be a surface that is configured to be touched.

The thin film may be made of polyimide.

The touch screen panel may further include an adhesive layer and a grounding electrode layer on the first side of the thin film.

In another exemplary embodiment according to the present invention, a method of fabricating a touch screen is provided. The method includes: forming a thin film, including an active area and a non-active area around the active area, on a glass substrate that is a carrier substrate; forming sensing patterns in the active area on a first side of the thin film and forming sensing lines coupled to the sensing patterns in the non-active area on the first side; separating the carrier substrate from the thin film; forming a decoration layer on a second side of the thin film, corresponding to the non-active area; and forming a functional coating layer on the second side of the thin film.

The forming the thin film may include coating a liquid-state polymer material on the glass substrate.

The liquid-state polymer material may be polyimide.

The method may further include forming an adhesive layer and a grounding electrode layer on the first side of the thin film.

The forming the functional coating layer may include forming one or more of an anti-reflective layer, an anti-finger layer, or a hard coating layer.

The separating of the carrier substrate from the thin film may include momentarily heating a bottom of the carrier substrate.

The separating of the carrier substrate from the thin film may include scanning and irradiating a laser beam at a bottom of the carrier substrate.

As described above, according to embodiments of the present invention, it is possible to achieve an ultrathin touch screen panel by forming sensing patterns on a thin film. Further, it is possible to reduce or minimize the thickness of an image display device equipped with the touch screen, by forming an edge decoration layer on the other side of the film with the sensing patterns, and forming a functional coating layer on the surface with the decoration layer to use the film as a window substrate.

BRIEF DESCRIPTION OF THE DRAWINGS

The accompanying drawings, together with the specification, illustrate exemplary embodiments of the present invention, and, together with the description, serve to explain aspects and principles of the present invention.

DETAILED DESCRIPTION

Figure 1:
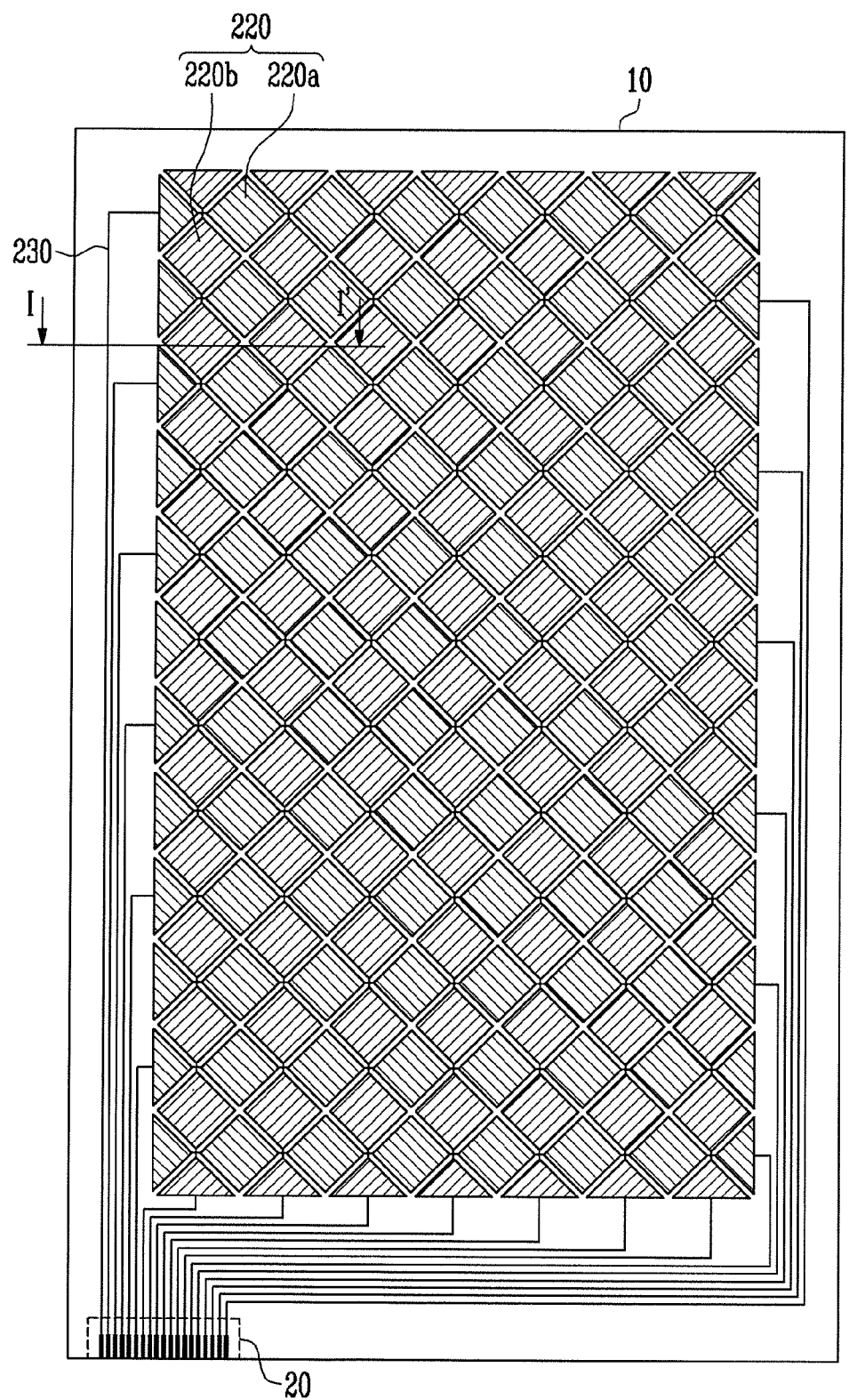
FIG. 1 is a plan view schematically showing a touch screen panel according to an embodiment of the present invention.

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "coupled to" another element, it can be directly coupled (for example, connected) to the other element or be indirectly coupled (for example, electrically connected) to the other element with one or more intervening elements interposed therebetween. Hereinafter, like reference numerals refer to like elements.

Figure 2:
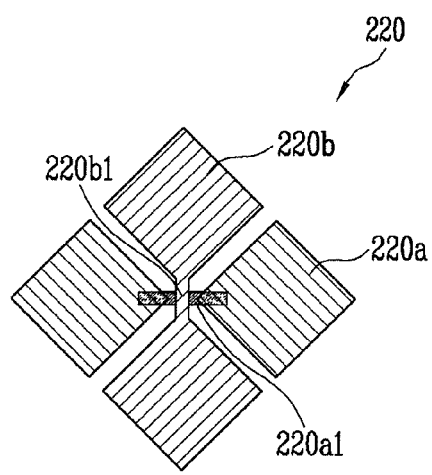
FIG. 2 is an enlarged view showing the main parts of a sample of the sensing pattern shown in FIG. 1.

Hereinafter, embodiments of the present invention will be described in detail with reference to the accompanying drawings. FIG. 1 is a plan view schematically showing a touch screen panel according to an embodiment of the present invention. FIG. 2 is an enlarged view showing the main parts of a sample of the sensing pattern shown in FIG. 1.

Referring to FIGS. 1 and 2, the touch screen panel includes a transparent thin film 10, a sensing pattern 220 on the thin film 10, and sensing lines 230 coupling the sensing pattern 220 with an external driving circuit through a pad unit 20. The transparent thin film 10 may be made of a material that can be formed as a thin film, such as plastic.

For example, the thin film 10 may be implemented by coating a thin layer of a polymer, such as polyimide, on a carrier substrate, such as a carrier substrate made of glass. The coating may be made, for instance, by spin coating or slit coating. Further, the polymer may be a substance that is transparent and has a high thermal resistance and chemical resistance.

The thin film 10 formed on the carrier substrate by coating may be about 0.005 mm to 0.05 mm thick. The thin film 10 is separated from the carrier substrate after the sensing pattern 220 and the sensing lines 230 coupling the sensing patterns 220 with the external driving circuit through the pad unit 20 are formed on the thin film 10, thereby achieving an ultrathin touch screen panel.

That is, the carrier substrate is not part of the touch screen panel. Instead, the carrier substrate is separated and removed after being used in the fabricating process of the touch screen panel. A method of fabricating a touch screen panel according to embodiments of the present invention will be described in more detail with reference to FIGS. 5A-5E.

The configuration of the touch screen panel of FIGS. 1-2 will now be described.

First, the sensing pattern 220, as shown in FIG. 2, includes a plurality of first sensing cells 220$a$ coupled to each other in the row direction via first connecting lines 220$a$1, and a plurality of second sensing cells 220$b$ coupled to each other in the column direction via second connecting lines 220$b$1. Although only some of the sensing patterns 220 are shown in FIG. 2 for convenience of illustration, the touch screen panel has a structure in which the sensing patterns 220 shown in FIG. 2 are repeatedly arranged.

As depicted in FIGS. 1-2, the first sensing cells 220$a$ and the second sensing cells 220$b$ are alternately arranged without overlap while the first connecting lines 220$a$1 and the second connecting lines 220$b$1 cross each other (for example, at crossing regions). Insulating layers may be located between the first connecting lines 220$a$1 and the second connecting lines 220$b$1 to ensure safety and a functioning device.

The first sensing cells 220$a$ and the second sensing cells 220$b$ may be made of a transparent material, such as indium-tin-oxide (hereafter, ITO), integrally with the first sensing lines 220$a$1 and the second sensing lines 220$b$1, respectively, or may be separately formed and electrically connected with each other. For example, the second sensing cells 220$b$ and the second connecting lines 220$b$1 may be integrally formed in the column direction while the first sensing cells 220$a$ are patterned separately between the second sensing cells 220$b$. Then, the first sensing cells 220$a$ may be coupled in the row direction by the first connecting lines 220$a$1.

In this configuration, the first connecting lines 220$a$1 may be electrically connected in direct contact with the first sensing cells 220$a$, above or below the first sensing cells 220$a$. In other embodiments, the first connecting lines 220$a$1 may be electrically connected to the first sensing cells 220$a$ through contact holes. The first connecting lines 220$a$1 may be made of a transparent electrode material, such as ITO, or an opaque low-resistant material, and the width or other dimensions or features can be adjusted to prevent visualization of the pattern.

The sensing lines are electrically connected to the first and second sensing cells 220$a$ and 220$b$ in each row and each column and connect the sensing cells with an external driving circuit, such as a position detecting circuit, through the pad unit 20. The sensing lines are disposed (for example, located) in a non-active area around an active area where an image is displayed, and may be made of a low-resistant material, such as Mo, Ag, Ti, Cu, Al, or Mo/Al/Mo, other than the transparent electrode material used for forming the sensing pattern 220.

The touch screen panel according to the embodiment of FIGS. 1-2 described above is a capacitive type touch panel, in which when a contact object, such as a human hand or a stylus pen contacts the touch screen panel, a change of electrostatic capacitance corresponding to the contact position is transmitted to the external driving circuit from the sensing pattern 220 through the sensing lines 230 and the pad unit 20. Accordingly, the change in capacitive capacity is converted into an electric signal by, for example, an X- and Y-input process circuit, such that the point of contact is located.

Figure 3:
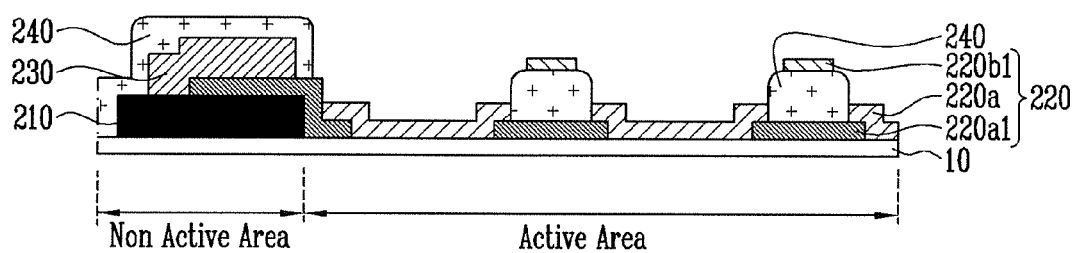
FIG. 3 is a cross-sectional view of a portion (I-I') of the touch screen panel of FIG. 1.

FIG. 3 is a cross-sectional view of a portion (I-I') of the touch screen panel of FIG. 1. That is, FIG. 3 is a cross-sectional view partially showing the non-active area and the active area of the touch screen panel on the thin film 10.

Referring to FIG. 3, the sensing patterns 220 in the active region of the thin film 10 includes the first sensing cells 220a coupled in a first (for example, row) direction in each row, the first connecting lines 220a1 coupling the first sensing cells 220a in the row direction, the second sensing cells 220b (see FIG. 1) coupled in a second (for example, column) direction in each column, and the second connecting lines 220b1 coupling the second sensing cells 220b in the column direction. In addition, insulating layers 240 are disposed at the intersections of the first connecting lines 220a1 and the second connecting lines 220b1.

Further, black matrixes 210 and sensing lines 230 overlapping the black matrixes 210 and electrically connected to the sensing patterns 220 are in the non-active area around the active area, as shown in the figure. The black matrixes 210 prevent patterns, such as those from the sensing lines 230, from being visualized, and form the edge of the display region.

In general, in the touch screen panel according to the embodiment shown in FIG. 3, a separate substrate (that is, the thin film 10 with the sensing patterns 220 thereon) is attached to the top of an image display device, and a window (that is, a protective transparent layer) is additionally disposed on the top of the touch screen panel to improve mechanical strength. However, when the touch screen panel and the window are attached to the top of the image display device, it increases the thickness of the image display device.

Accordingly, in another embodiment of the present invention, it is possible to reduce or minimize the thickness of an image display device that is equipped with the touch screen panel, by forming a decoration panel (which was already being provided to some existing windows) on the other side of the thin film with the sensing patterns, and forming a functional coating layer on the side with the decoration layer to use the thin film 10 as a window substrate.

Figure 4A:
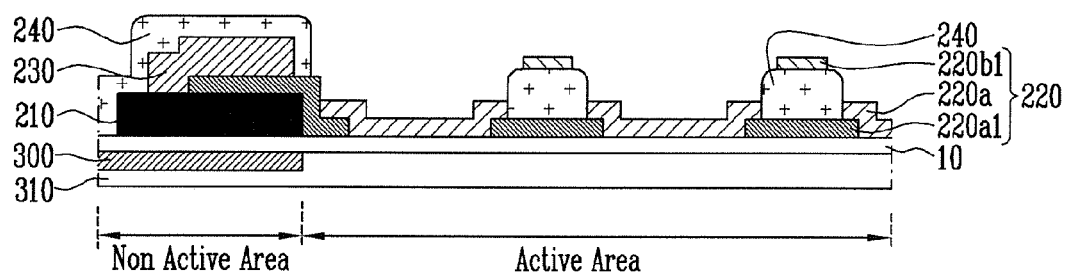
FIGS. 4A and 4B are cross-sectional views of a portion (I-I') of the touch screen panel of FIG. 1 according to other embodiments of the present invention.
Figure 4B:
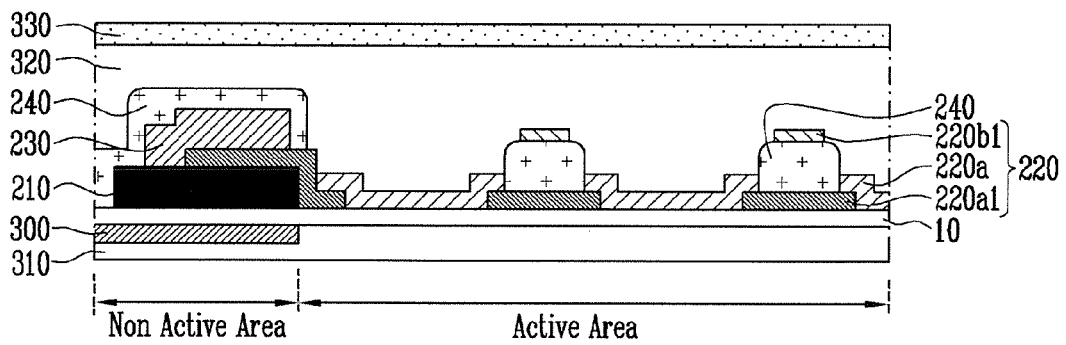

FIGS. 4A and 4B are cross-sectional views of the portion (I-I') of the touch screen panel of FIG. 1 according to other embodiments of the present invention. That is, FIGS. 4A and 4B are cross-sectional views showing the same region as in the embodiment shown in FIG. 3. Accordingly, components in FIGS. 4A and 4B that are the same as components of the embodiment shown in FIG. 3 are designated by the same reference numerals and their detailed description will not be repeated.

Referring to FIG. 4A, the first side of the thin film 10 includes an active area with the sensing patterns, etc., as shown in FIG. 3, and a non-active around the active area. In addition, a decoration layer 300 is in a region corresponding to the non-active area on the second side opposite to the first side.

The decoration layer 300 is disposed on an existing window substrate and surrounds the edge of the active region, and can display, for example, a logo, inside the decoration layer 300. Further, the decoration layer 300 may be implemented by various colors that do not transmit light, and may be attached in a film to the second side of the thin film 10.

Further, in the embodiment shown in FIG. 4A, since the decoration layer 300 is formed in a thin film on the second side, corresponding to the non-active area, the black matrixes 210 in the non-active area on the first side may be removed. However, as shown in FIG. 4A, this is an example where the black matrixes 210 are formed on the non-active area on the first side, without being removed.

Further, at least one or more functional coating layers 310 may be formed on the second side of the thin film with the decoration layer 300 and the functional coating layer 310 may be, for example, an anti-reflection (anti-reflective) layer, an anti-finger layer, or a hard coating layer. That is, in the embodiment shown in FIG. 4A, the second side of the thin film 10 is the surface that a person's finger or a stylus pen contacts, such that the thin film 10 with the sensing patterns 220 can function as a window.

Therefore, according to the embodiment shown in FIG. 4A, the thin film 10 and the window are integrally implemented, without a specific window. Consequently, it is possible to improve fabrication efficiency by simplifying the fabricating process and reducing the material cost, in addition to implementing a thin touch screen panel.

Further, in the embodiment shown in FIG. 4B, it is different than the embodiment shown in FIG. 4A in that an adhesive layer 320 and a grounding electrode layer 330 are further formed on the first side of the thin film 10 with the sensing patterns 220. In this configuration, the adhesive layer 320 may be made of a transparent adhesive having high light transmittance, such as SVR (Super View Resin) or OCA (Optical Cleared Adhesive).

Further, the grounding electrode layer 330 is made of a transparent electrode material, such as ITO, and may be used to ensure safety between a touch screen panel and an image display panel equipped with the touch screen panel as well as to achieve electrostatic capacitance with the sensing patterns 220, depending on the design type of touch screen panels. That is, in a capacitive type of touch screen, the electrostatic capacitance between the first and second sensing cells 220a and 220b and the grounding electrode layer 330 can be used to sense a contact position.

FIGS. 5A to 5E are cross-sectional views illustrating a method of fabricating a touch screen panel according to embodiments of the present invention. It should be noted that FIGS. 5A to 5E provide cross-sectional views of a specific portion (I-I') of the touch screen panel shown in FIG. 1, that is, illustrate the fabricating process for the region shown in FIGS. 3 and 4A-4B, for the convenience of description.

Figure 5A:
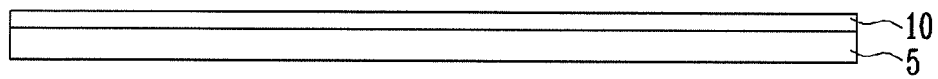
FIGS. 5A to 5E are cross-sectional views illustrating a method of fabricating a touch screen panel according to embodiments of the present invention.

Referring to FIG. 5A, a thin film is formed by coating a polymer (for example, a liquid state polymer material) on a glass substrate 5, which is a carrier substrate. The glass substrate 5 may be, for example, about 0.5 mm thick and the thin film formed by the coating may be about 0.005 mm to 0.05 mm thick. That is, the thin film can be about 1/10 as thick as the glass substrate.

The polymer is transparent and has high thermal resistance and chemical resistance. For example, polyimide may be used. Further, the coating may be spin coating or slit coating, and the liquid-state polymer becomes the transparent thin film 10, as shown in the figures, by coating and hardening.

Figure 5B:
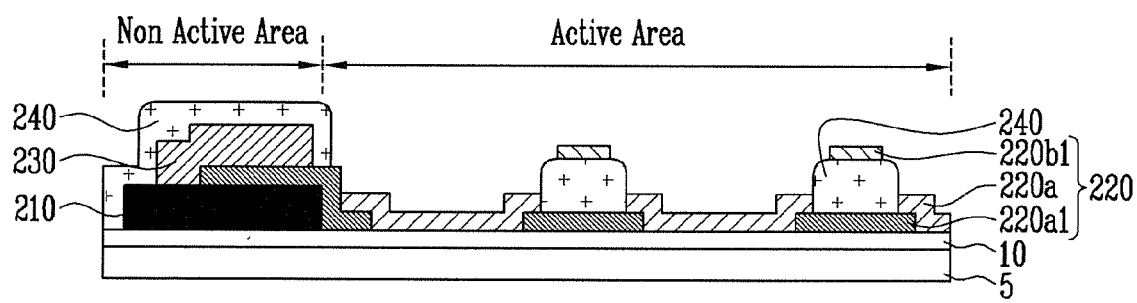

Thereafter, a touch screen panel is formed on the thin film 10, as shown in FIG. 5B. The touch screen panel includes an active area with sensing patterns 220 and a non-active area around the active area with sensing lines 230 coupled to the sensing patterns 220. The detailed configuration is the same as that of the embodiment shown in FIG. 3, such that the same components are designated by the same reference numerals and their detailed description is not repeated.

Figure 5C:
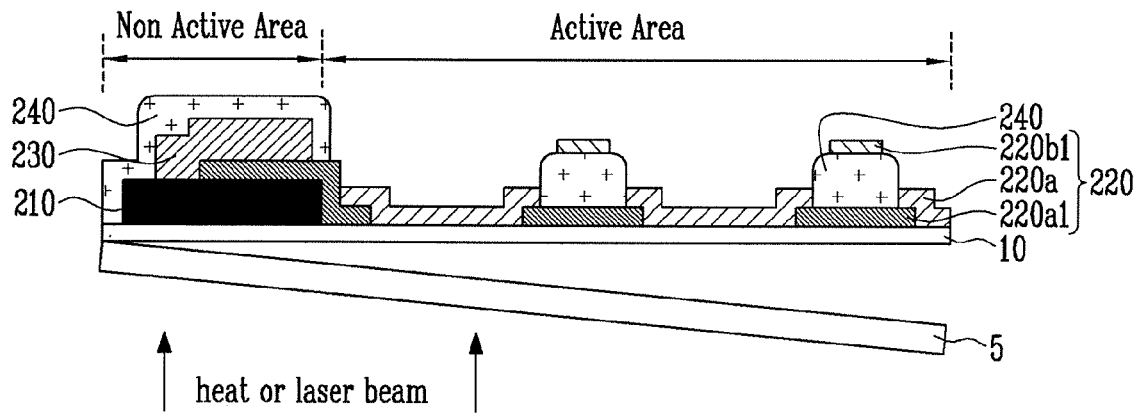

Thereafter, after all the components of the touch screen panel are formed on the thin film 10, as shown in FIG. 5C, the glass substrate 5, which is a carrier substrate, is separated from the thin film 10. However, it is important to separate the glass substrate 5 without damaging the components on the thin film 10. Accordingly, an embodiment of the present invention separates the glass substrate, using a difference in thermal expansion or using a laser beam.

First, the method of separating a glass substrate by using a difference in thermal expansion uses a difference in the coefficient of thermal expansion to separate the glass substrate 5 and the coated thin film 10. For example, the thin film 10 attached to the top of the glass substrate 5 may be separated by bonding a heating plate to the bottom of the glass substrate 5 and momentarily heating the glass substrate 5.

Next, the method of separating a glass substrate by using a laser beam separates the interface between the thin film 10 attached to the top of the glass substrate 5 and the glass substrate 5 by scanning and irradiating a laser beam at the bottom of the glass substrate 5.

The touch screen panel according to the embodiment shown in FIG. 3 is fabricated by the processes shown in FIG. 5A through FIG. 5C. Accordingly, an ultrathin touch screen panel can be implemented by forming the sensing patterns 220 on the thin film 10.

Figure 5D:
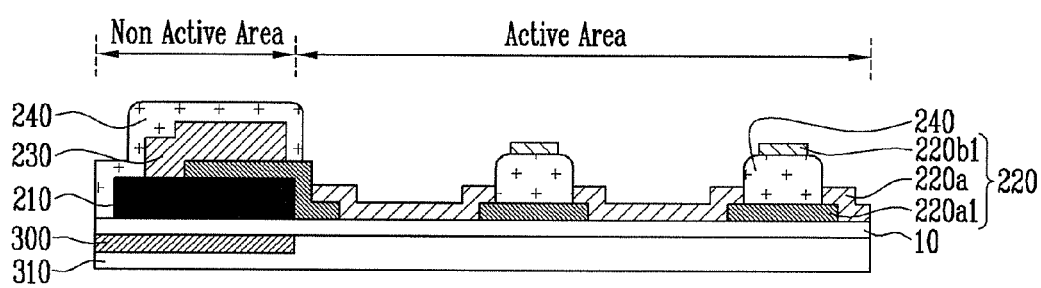

Further, the decoration layer 300 can be additionally formed in the area corresponding to the non-active area, on the opposite side of the first side of the thin film 10 where the sensing patterns 220, etc., are formed, as shown in FIG. 5D, after the above processes. In this configuration, the decoration layer 300 may be implemented in various colors that do not transmit light, and may be attached in a film to the second side of the thin film 10. Further, at least one or more functional coating layers 310, such as an anti-reflection layer, an anti-finger layer, or a hard coating layer, may be formed on the second side of the thin film 10 with the decoration layer 300, such that the touch screen panel according to the embodiment shown in FIG. 4A is fabricated.

Figure 5E:
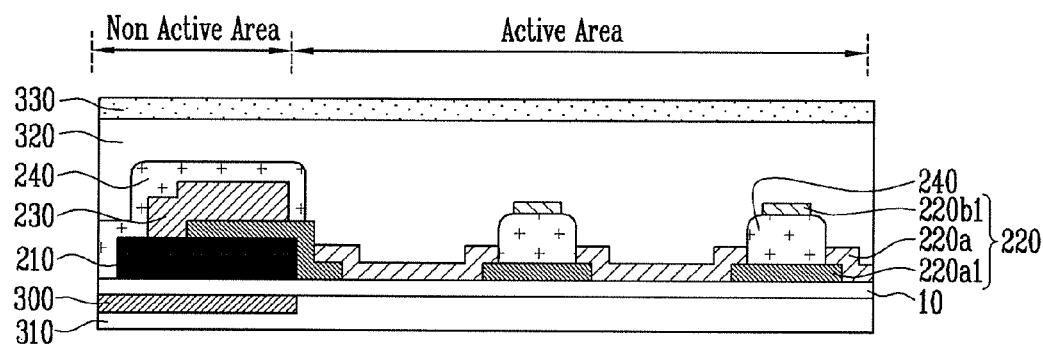

In addition, as shown in FIG. 5E, the adhesive layer 320 and the grounding electrode layer 330 may be additionally formed on the first side of the thin film 10 with the sensing patterns 220, such that the touch screen panel according to the embodiment shown in FIG. 4B is fabricated. In this configuration, the adhesive layer 320 may be made of a transparent adhesive having high light transmittance, such as SVR (Super View Resin) or OCA (Optical Cleared Adhesive), and the grounding electrode layer 330 is made of a transparent electrode material, such as ITO.

It should be noted that the process shown in FIG. 5E may be performed before the carrier substrate 5 is separated. In summary, the thin film 10 with the sensing patterns 220 can operate as a window by additionally performing the processes shown in FIG. 5D and FIG. 5E.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
   a thin film comprising an active area and a non-active area around the active area;
   sensing patterns in the active area and formed on a first side of the thin film;
   sensing lines in the non-active area and formed on the first side of the thin film, the sensing lines being coupled to the sensing patterns;
   a decoration layer directly formed on a second side of the thin film and corresponding to the non-active area; and
   a functional coating layer on the second side of the thin film.

2. The touch screen panel according to claim 1, wherein the sensing patterns comprise:
   first sensing cells coupled in a first direction;
   first connecting lines coupling the first sensing cells in the first direction;
   second sensing cells coupled in a second direction that crosses the first direction; and
   second connecting lines coupling the second sensing cells in the second direction.

3. The touch screen panel according to claim 2, wherein insulating layers are at crossing regions of the first connecting lines and the second connecting lines.

4. The touch screen panel according to claim 1, further comprising black matrix in the non-active area on the first side of the thin film.

5. The touch screen panel according to claim 1, wherein the decoration layer is attached in a film to the second side of the thin film.

6. The touch screen panel according to claim 1, wherein the functional coating layer comprises one or more of an anti-reflective layer, an anti-finger layer, or a hard coating layer.

7. The touch screen panel according to claim 1, wherein the thin film with the functional coating layer functions as a window and the second side is a surface that is configured to be touched.

8. The touch screen panel according to claim 1, wherein the thin film is made of polyimide.

9. The touch screen panel according to claim 1, further comprising an adhesive layer and a grounding electrode layer on the first side of the thin film.

* * * * *